United States Patent
Neely et al.

(10) Patent No.: US 7,246,322 B2
(45) Date of Patent: Jul. 17, 2007

(54) GRID-LIKE GUIDED USER INTERFACE FOR VIDEO SELECTION AND DISPLAY

(75) Inventors: Shawn R. Neely, Sunnyvale, CA (US); Lawrence Kesteloot, San Francisco, CA (US); Margaret Novotny, San Francisco, CA (US); Marion Buchenau, San Francisco, CA (US); Sheila A. Foley, Sausalito, CA (US); Michael O'Neil, San Francisco, CA (US)

(73) Assignee: Kaleidescope, Inc., Mountain View, CA (US)

( * ) Notice: Subject to any disclaimer, the term of this patent is extended or adjusted under 35 U.S.C. 154(b) by 910 days.

(21) Appl. No.: 10/418,949

(22) Filed: Apr. 18, 2003

(65) Prior Publication Data

US 2004/0073921 A1 Apr. 15, 2004

Related U.S. Application Data

(63) Continuation of application No. 10/418,739, filed on Apr. 18, 2003.

(60) Provisional application No. 60/439,330, filed on Jan. 9, 2003, provisional application No. 60/394,922, filed on Jul. 9, 2002, provisional application No. 60/394,588, filed on Jul. 9, 2002.

(51) Int. Cl.
*G06F 7/00* (2006.01)
*G06F 17/60* (2006.01)

(52) U.S. Cl. ..................... 715/747; 715/821

(58) Field of Classification Search ........ 715/744–747, 715/821–824, 719–726, 771–773, 970.1, 715/962; 707/3; 709/224, 217, 246; 705/27; 725/47, 46, 61
See application file for complete search history.

(56) References Cited

U.S. PATENT DOCUMENTS 4,992,940 A 2/1991 Dworkin (Continued)

FOREIGN PATENT DOCUMENTS

WO WO 2004/064372 A2 7/2004

OTHER PUBLICATIONS

Microsoft Corporation. "Add/Remove Programs Overview." Feb. 28, 2000, Microsoft Corporation, http://www.microsoft.com/windows2000/en/advanced/help/default.asp?url=/windows2000/en/advanced/help/win_addprog_window_component.htm.

(Continued)

*Primary Examiner*—Steven Sax
(74) *Attorney, Agent, or Firm*—Swernofsky Law Group PC (57) ABSTRACT

A UI including a "Guide," presenting a list of videos, having data fields relating to each entry, possibly including multiple data values for a single data field. When focusing on a single entry, the focused-upon entry is expanded and emphasized. The focused-upon entry is highlighted and centered, while other entries have lesser highlighting and centering. When a data field is selected, the focused-upon data field is emphasized (by highlighting, repositioning, or resizing), while other entries have lesser emphasis. Display changes might appear after a brief delay, or in response to further user command. When entries are sorted on selected data fields, entries with multiple data values for those fields are replicated, and the sorting letter is highlighted. The user can move individually down the list of entries, or skip to the next section with a different data value for a selected field.

3 Claims, 3 Drawing Sheets

U.S. PATENT DOCUMENTS

| | | | |
|---|---|---|---|
| 5,335,277 | A | 8/1994 | Harvey et al. |
| 5,337,357 | A | 8/1994 | Chou et al. |
| 5,410,415 | A | 4/1995 | Parulskl et al. |
| 5,724,327 | A | 3/1998 | Timmermans et al. |
| 5,765,176 | A | 6/1998 | Bloomberg |
| 5,896,454 | A | 4/1999 | Cookson et al. |
| 5,946,665 | A | 8/1999 | Suzuki et al. |
| 6,009,525 | A | 12/1999 | Horstmann |
| 6,182,069 | B1 | 1/2001 | Niblack et al. |
| 6,188,728 | B1 | 2/2001 | Hurst |
| 6,192,139 | B1 | 2/2001 | Tao |
| 6,209,092 | B1 | 3/2001 | Linnartz |
| 6,243,725 | B1 * | 6/2001 | Hempleman et al. ....... 715/530 |
| 6,260,024 | B1 | 7/2001 | Shkedy |
| 6,301,586 | B1 | 10/2001 | Yang et al. |
| 6,349,143 | B1 | 2/2002 | Hastings et al. |
| 6,366,910 | B1 | 4/2002 | Rajaraman |
| 6,374,036 | B1 | 4/2002 | Ryan et al. |
| 6,411,725 | B1 | 6/2002 | Rhoads |
| 6,463,426 | B1 | 10/2002 | Lipson et al. |
| 6,463,431 | B1 | 10/2002 | Schmitt |
| 6,563,935 | B1 | 5/2003 | Echizen et al. |
| 6,614,914 | B1 | 9/2003 | Rhoads et al. |
| 6,618,035 | B1 * | 9/2003 | Reza ........................ 345/158 |
| 6,625,581 | B1 | 9/2003 | Perkowski |
| 6,629,097 | B1 | 9/2003 | Kelth |
| 6,633,653 | B1 | 10/2003 | Hobson et al. |
| 6,642,939 | B1 | 11/2003 | Vallone et al. |
| 6,694,041 | B1 | 2/2004 | Brunk |
| 6,714,683 | B1 | 3/2004 | Tian et al. |
| 6,728,213 | B1 | 4/2004 | Tzeng et al. |
| 6,772,340 | B1 | 8/2004 | Pelnado et al. |
| 6,801,999 | B1 | 10/2004 | Venkatesan et al. |
| 6,889,383 | B1 | 5/2005 | Jarman |
| 6,904,151 | B2 | 6/2005 | Deguillaume et al. |
| 6,904,410 | B1 | 6/2005 | Welss et al. |
| 6,957,232 | B2 | 10/2005 | Hoeye et al. |
| 6,971,013 | B2 | 11/2005 | Mihcak et al. |
| 6,973,574 | B2 | 12/2005 | Mihcak et al. |
| 7,002,603 | B2 | 2/2006 | Tapson |
| 7,003,131 | B2 | 2/2006 | Watson et al. |
| 7,032,177 | B2 | 4/2006 | Novak et al. |
| 7,036,024 | B2 | 4/2006 | Watson |
| 7,076,737 | B2 * | 7/2006 | Abbott et al. ............... 715/744 |
| 7,099,491 | B2 | 8/2006 | Takaku |
| 7,111,171 | B2 | 9/2006 | Collens et al. |
| 2001/0037465 | A1 | 11/2001 | Hart et al. |
| 2001/0039659 | A1 | 11/2001 | Simmons et al. |
| 2001/0051996 | A1 | 12/2001 | Cooper et al. |
| 2001/0056398 | A1 * | 12/2001 | Scheirer ...................... 705/38 |
| 2002/0029187 | A1 | 3/2002 | Meehan et al. |
| 2002/0054174 | A1 * | 5/2002 | Abbott et al. ............... 345/863 |
| 2002/0085713 | A1 | 7/2002 | Felg et al. |
| 2002/0087876 | A1 | 7/2002 | Larose |
| 2002/0095582 | A1 | 7/2002 | Peled et al. |
| 2002/0116707 | A1 | 8/2002 | Morris et al. |
| 2002/0118299 | A1 | 8/2002 | Kahn |
| 2002/0138741 | A1 | 9/2002 | Koch |
| 2002/0150277 | A1 | 10/2002 | Nishimoto et al. |
| 2002/0172394 | A1 | 11/2002 | Venkatesan et al. |
| 2002/0174021 | A1 | 11/2002 | Chu et al. |
| 2002/0178077 | A1 | 11/2002 | Katz et al. |
| 2002/0196976 | A1 | 12/2002 | Mihcak et al. |
| 2003/0009671 | A1 | 1/2003 | Yacobi et al. |
| 2003/0014751 | A1 | 1/2003 | Paek |
| 2003/0018972 | A1 * | 1/2003 | Arora ......................... 725/47 |
| 2003/0030752 | A1 | 2/2003 | Begeja et al. |
| 2003/0050818 | A1 * | 3/2003 | Maie et al. .................... 705/8 |
| 2003/0182297 | A1 | 9/2003 | Murakami et al. |
| 2004/0039661 | A1 * | 2/2004 | Fuzell-Casey et al. ........ 705/27 |
| 2004/0039814 | A1 * | 2/2004 | Crabtree et al. ............. 709/224 |
| 2004/0044658 | A1 * | 3/2004 | Crabtree et al. ............... 707/3 |
| 2004/0049537 | A1 * | 3/2004 | Titmuss ..................... 709/203 |
| 2004/0139064 | A1 | 7/2004 | Chevallier et al. |
| 2006/0004680 | A1 * | 1/2006 | Robarts et al. ............... 706/12 |
| 2006/0095300 | A1 * | 5/2006 | Schrier et al. ................. 705/3 |

OTHER PUBLICATIONS

Microsoft Corporation. "Excel." 2005, Microsoft Corporation, http://office.microsoft.com/en-us/FX010858001033.aspx.

Microsoft Corporation. "Outlook Express Builds on Success." Oct. 15, 2003, Microsoft Corporation, http://www.microsoft.com/windows/oe/.

Readerware Corporation. "ReaderwareVW Features." Apr. 14, 2005, Readerware Corporation, http://www.readerware.com/rwVW.html.

Chu et al. "A Secure Multicast Protocol with Copyright Protection." ACM SIGCOMM Computer Communications Review, Apr. 2002, pp. 42-60, vol. 32, No. 2.

Dittman, "Combining Digital Watermarks and Collusion Secure Fingerprints for Customer Copy Monitoring." The Institution of Electrical Engineers, 2000, pp. 6/1-6/6, IEE.

Fridrich. "Copyright Protection of Digital Images (authentication)." http://www.ws.binghamton.edu/fridrich/Research'tutor2.ppt, Feb. 18, 2003, entire document.

* cited by examiner

GRID-LIKE GUIDED USER INTERFACE FOR VIDEO SELECTION AND DISPLAY

INCORPORATED DISCLOSURES

This application claims priority of the following documents, each of which is hereby incorporated by reference as if fully set forth herein.

U.S. provisional patent application 60/394,922, filed Jul. 9, 2002, in the name of Michael Malcolm, Stephen Watson, and Daniel Collens, titled "System Architecture of a System for Secure Distribution of Media."

U.S. provisional patent application 60/394,588, filed Jul. 9, 2002, in the name of Michael Malcolm, Stephen Watson, and Daniel Collens, titled "Topology of Caching Nodes in a System for Secure Delivery of Media Content."

U.S. provisional patent application 60/439,330, filed Jan. 31, 2003, in the name of the same inventors as this application, titled "User Interface for Video Selection and Display".

U.S. patent application 10/418,739 filed this same day, in the name of the same inventors as this application, titled "Mosaic-Like User Interface for Video Selection and Display".

These documents are hereby incorporated by reference as if fully set forth herein, and are sometimes referred to herein as the "incorporated disclosure".

Inventions described herein can be used in combination or conjunction with technology described in the incorporated disclosure.

BACKGROUND OF THE INVENTION

1. Field of the Invention

The invention relates to user interfaces for video selection and display.

2. Related Art

In systems for presenting information, such as for example audiovisual media, there are now so many possible choices that individuals find it difficult to remember them all. Accordingly, such systems generally involve a UI (user interface) by which users might search for possible choices, with the effect that those users are able to select one or more choices for presentation. However, while they achieve the general goal of allowing users to search and select, known systems are subject to several draw-backs.

First, there are often such a large number of entries or titles that presenting even a small fraction of them for review by users, such as on an OSD (on screen display), or a video screen or similar interface, is unwieldy. Some known systems allow users to scroll forward and backward through a relatively long list of entries, but one result of such scrolling is that the user is continually presented with entries of interest at the very edge of the OSD, with the effect that the user loses much of the context that might be available from being able to review those entries just beyond the edge of the OSD. There are several aspects of the invention in which this problem is ameliorated: (1) relatively large lists, whether long or wide, are presented in such manner as to centralize and emphasize a focused-upon entry, and (2) relatively large entries, whether long or wide, are presented in such manner as to reduce the amount of presented information when not subject to focus, and are presented in such manner as to increase the amount of presented information when subject to focus.

Second, many entries or titles have data fields that might be categorized into multiple groups. For example, many videos might be characterized as both "comedy" and "western," or as both "action-adventure" and "mystery," and the like. Some known systems allow users to search or sort entries by such categories, but the user's ability to locate entries with similar categories can be relatively limited, depending on the degree of sorting allowed and the number of sort keys allowed per entry. Moreover, such known systems often involve large numbers of data fields, such as for example a first genre, a second genre, and the like, with the effect that presentation of individual entries can be unwieldy from being wider than the OSD. There are several aspects of the invention in which this problem is ameliorated: (1) multiple such categories are combined into a single searchable and sortable data field, with the effect that the width of each entry is substantially limited to the width of the OSD, (2) multiple copies of entries having multiple such categories are generated in response to searching or sorting requests by the user, with the effect that the user can use natural scrolling techniques to find titles that share similar categories, even if those titles also can be simultaneously classified in quite different categories.

Accordingly, it would be advantageous to provide an improved user interface for video selection and display.

SUMMARY OF THE INVENTION

The invention provides a method and system capable of presenting a UI (user interface) involving selection and display of videos from a library thereof, although of course the concepts of the invention are not limited to videos. The UI includes a "Guide" mode of operation, in which a list of possible videos is presented, and from which a user might select one such video in response to information about that video.

The Guide is organized as a list of entries, each of which has multiple data fields relating to that entry. One aspect of the Guide is that it includes multiple data values for each data field, such as for example multiple actors or multiple genres associated with a single video. The Guide includes at least the following novel concepts:

1. Expansion/Collapse and Positioning of Entries and Data Fields

Individual entries in the Guide are limited in size, with the effect that many such entries can be displayed concurrently with an OSD (on screen display). However, when the user focuses on a single such entry, information about the focused-upon entry is expanded and that entry is emphasized, with the effect that the user can more easily review information about the focused-upon entry. This has the effect of presenting to the user a viewing illusion on the OSD that the additional information pushes downwards those entries after the focused-upon entry, and expands the focused-upon entry into a highlighted multi-line entry. This has the effect of emphasizing the focused-upon entry and making it more easily read and comprehended by the user.

When a particular entry is selected, information about the focused-upon entry is highlighted and centered in the OSD, while information about other entries have lesser highlighting and are less centered. This has the effect of presenting to the user a viewpoint (that is, an aspect of viewing or a viewing illusion) that the OSD is centered on the selected entry (that is, row). Similarly, this has the effect of presenting to the user a viewpoint (that is, a viewing illusion) that the OSD is similar to a window centered on the selected entry (that is, row), with user input causing the OSD to move smoothly up or down among a long list of entries (that is, rows) otherwise too large (that is, long) to fit within that window, where the boundaries of the OSD are the limits of the window or of the user's field of vision.

Similarly, when a particular data field is selected, information about the focused-upon data field is emphasized in the OSD (whether by highlighting, repositioning, resizing, or another technique), while information about other entries have lesser emphasis. This has the effect of presenting to the user a viewing illusion that the OSD is emphasizes the selected data field (that is, column). Similarly, this has the effect of presenting to the user a viewing illusion that the OSD is similar to a window centered on the selected data field (that is, column), with user input causing the OSD to move right or left among a group of data fields (that is, columns) otherwise too large (that is, wide) to fit within that window.

In those cases when the user focuses on a single such entry (that is, a selected particular row), the Guide provides either that (a) additional information appears after a brief delay, such as a time interval that would be physiologically or psychologically natural or pleasing, with the effect that the user perceives the rearrangement of the OSD in response to the selection of focus, or (b) additional information appears in response to a further user command, such as an explicit button press or mouse click, with the effect that the user perceives the rearrangement of the OSD in response to the explicit button press or mouse click. In the former case, the Guide provides a more automated-like response to user action, while in the latter case, the Guide provides a more command-like response to user action.

Similarly, in those cases when the user focuses on a single such data field (that is, a selected particular column), the Guide provides either that (a) those entries (that is, rows) being presented are reordered according to that data field after a brief delay, such as a time interval that would be physiologically or psychologically natural or pleasing, with the effect that the user perceives the rearrangement of the OSD in response to the selection of focus, or (b) those entries (that is, rows) being presented are reordered according to that data field in response to a further user command, such as an explicit button press or mouse click, with the effect that the user perceives the rearrangement of the OSD in response to the explicit button press or mouse click. Similar to the user selection of focus, in the former case, the Guide provides a more automated-like response to user action, while in the latter case, the Guide provides a more command-like response to user action.

2. Sorting and Replication of Entries and Data Fields

Entries in the Guide can be sorted on selected data fields. When this is done, entries with multiple data values for those fields are replicated in each section of the Guide where those data values for that field predominates. For example, not intended to be limiting in any way, if an individual video is associated with multiple genres (both a "comedy" and a "western"), an entry for that video is presented in both the "comedy" and "western" sections of the Guide.

When entries in the Guide are sorted, the sorting letter is highlighted, with the effect that the user can more easily determine which section of the Guide is being presented. For example, not intended to be limiting in any way, multiple entries with titles beginning with articles such as "A ", "An", "The", and the like (and other known stopwords) are sorted in response to other words, and the initial letters of those other words are highlighted.

When entries in the Guide are sorted, a user is presented with the both the option of moving individually down the list of entries, or skipping to the next section with a different data value for a selected field. For example, not intended to be limiting in any way, a user can skip to the comedy section without having to scroll through multiple entries that might precede that section.

DETAILED DESCRIPTION OF THE PREFERRED EMBODIMENT

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography

The general meaning of each of these following terms is intended to be illustrative and in no way limiting.

The phrase "media stream" describes information intended for presentation in a sequence, such as motion pictures including a sequence of frames or fields, or such as audio including a sequence of sounds. As used herein, the phrase "media stream" has a broader meaning than the standard meaning for "streaming media," (of sound and pictures that are transmitted continuously using packets and that start to play before all of the content arrives). Rather, as described herein, there is no particular requirement that "media streams" must be delivered continuously. Also as described herein, media streams can refer to other information for presentation, such as for example animation or sound, as well as to still media, such as for example pictures or illustrations, and also to databases and other collections of information.

The phrase "digital content" describes data in a digital format, intended to represent media streams or other information for presentation to an end viewer. "Digital content" is distinguished from packaging information, such as for example message header information. For the two phrases "digital content" and "media stream," the former describes a selected encoding of the latter, while the latter describes a result of presenting any encoding thereof.

The scope and spirit of the invention is not limited to any of these definitions, or to specific examples mentioned therein, but is intended to include the most general concepts embodied by these and other terms.

System Elements

Figure 1:
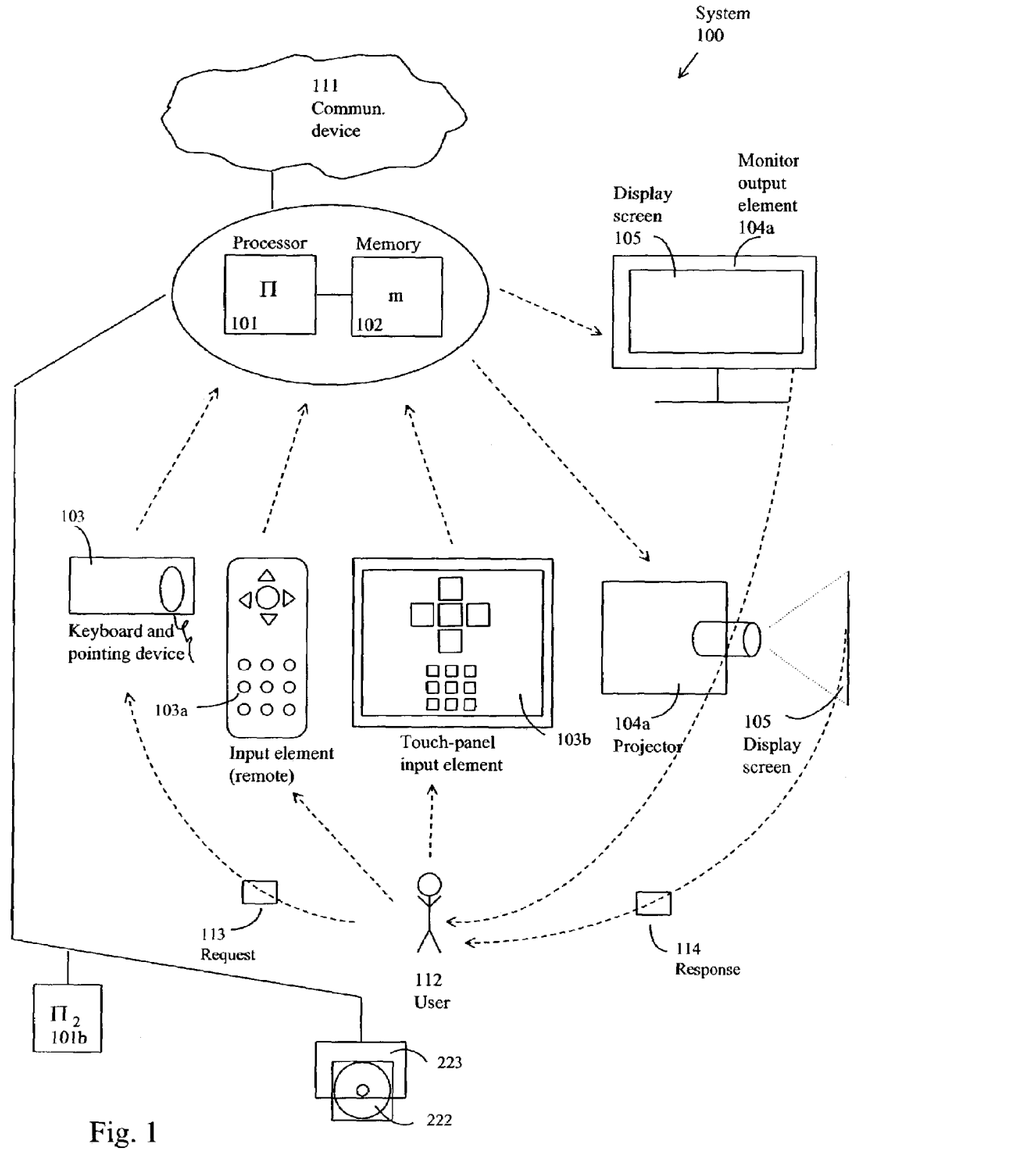
FIG. 1 shows a block diagram of a system including a grid-like guided user interface for video selection and display.

FIG. 1 shows a block diagram of a system including a grid-like guided user interface for video selection and display.

A system 100 includes a processor 101, program and data memory or mass storage 102, at least one input element 103, and at least one output element 104.

Those of ordinary skill in the art will recognize, after perusal of this application, that each of these elements in a system 100 might be implemented in one of a variety of possible ways.

For example, not intended to be limiting in any way, the processor 101 and the program and data memory or mass storage 102 might include one or more of the following devices, possibly operating in combination of conjunction: (a) preferably, a stand-alone computing device, such as a set-top box or other auxiliary presentation and display decoder, capable of generalized computation and presentation of information; (b) a PC (personal computer), laptop, workstation, or other device suitable for generalized computation and presentation of information; (c) a handheld computer, "Palm Pilot" device, or other portable device suitable for generalized computation and presentation of information; or (d) any other type of computing device suitable for generalized computation and presentation of information.

For example, not intended to be limiting in any way, the at least one input element 103 might include one or more of the following devices, possibly operating in combination of conjunction: (a) preferably, a remote control, such as a television infrared remote control 103a or a touch-panel control 103b or other type of remote control, (b) a workstation input element 103c, such as for example a keyboard along with a mouse or other pointing device, (c) or other data entry elements, such as for example a speech input or speech recognition device.

For example, not intended to be limiting in any way, the at least one output element 104 might include one or more of the following devices, possibly operating in combination of conjunction: (a) preferably, a flat panel display or computer monitor or television monitor or other display device 104a, along with speakers or other sound presentation devices, (b) another type of television device, such as a projection television device; (c) a projector 104b along with a projection screen or other projection surface; or (d) any other type of device or method suitable for presentation of information. In such cases, the active portion of the video display for the television or other display device is herein sometimes referred to as the display screen 105, and the speakers or other sound presentation devices are herein sometimes referred to as the speaker 106.

Those skilled in the art will recognize, after perusal of this application, that embodiments involving set-top boxes or other auxiliary presentation and display decoders, operating in combination or conjunction with remote controls 103a or touch-panel controls 103b, might be combined in part with embodiments involving PCs, laptops, or workstations, operating in combination or conjunction with workstation input elements 103c such as keyboards and mice. Moreover, those skilled in the art will recognize, after perusal of this application, that such combinations are within the scope and spirit of the invention, and would be workable without undue experimentation or further invention.

In one embodiment, the system 100 is coupled to at least one communication element 110 capable of sending and receiving information from a logically remote device 111, such as for example a computer network coupled to an internet, intranet, LAN, WAN, VPN, enterprise network. In one embodiment, the logically remote device 111 might include one or more computing devices capable of receiving requests from a user 112 of the system 100 and responding to those requests by providing information related to use of the system 100. For example, not intended to be limiting in any way, the information might include (a) media streams, such as for example movies; or might include (b) metadata (such as for example titles, ratings, and the like, as further described herein) about those media streams.

Those skilled in the art would recognize, after perusal of this application, that the communication element 110 could be used in combination or conjunction with the incorporated disclosure, including techniques shown in the provisional patent applications titled "SYSTEM ARCHITECTURE OF A SYSTEM FOR SECURE DISTRIBUTION OF MEDIA" and "TOPOLOGY OF CACHING NODES IN A SYSTEM FOR SECURE DELIVERY OF MEDIA CONTENT."

The memory or mass storage 102 is capable of including instructions capable of being executed or interpreted by the processor 101 to perform steps as described herein. The memory or mass storage 102 is also capable of maintaining data on behalf of the processor 101 as described herein.

The system 100, using the at least one input element 103, is disposed for receiving information from the user 112, such as for example an individual who desires to select a movie for viewing, and using the at least one output element 104, is disposed for presenting information to the user 112. However, in the context of the invention, there is no particular requirement that the user 112 is so limited. The user 112 might include an individual, a company or family or other group, or another entity. In one embodiment, where the user 112 includes a company or family or other group, the user 112 might include more than one person who interacts with the system 100 from time to time.

Moreover, in the context of the invention, there is no particular requirement that the same information is received from each input element 103 or that the same information is presented at each output element 104. In one embodiment, the one or more input elements 103 and the one or more output elements 104 are coupled to the processor 101 and the memory or mass storage 102 using a local network, such as for example a LAN, VPN, or enterprise network.

The system 100, using the processor 101 and program and data memory or mass storage 102, is disposed for processing information from the user 112, such as (a) receiving commands or requests 113 from the user 112, (b) parsing or recognizing those commands or requests 113, (c) determining one or more responses 114 to make to those commands or requests 113, and (d) directing the at least one output element 104 to present those responses 114 to the user 112.

The system 100, using the at least one output element 104, is disposed for presenting information to the user 112.

On-Screen Display

Figure 2:
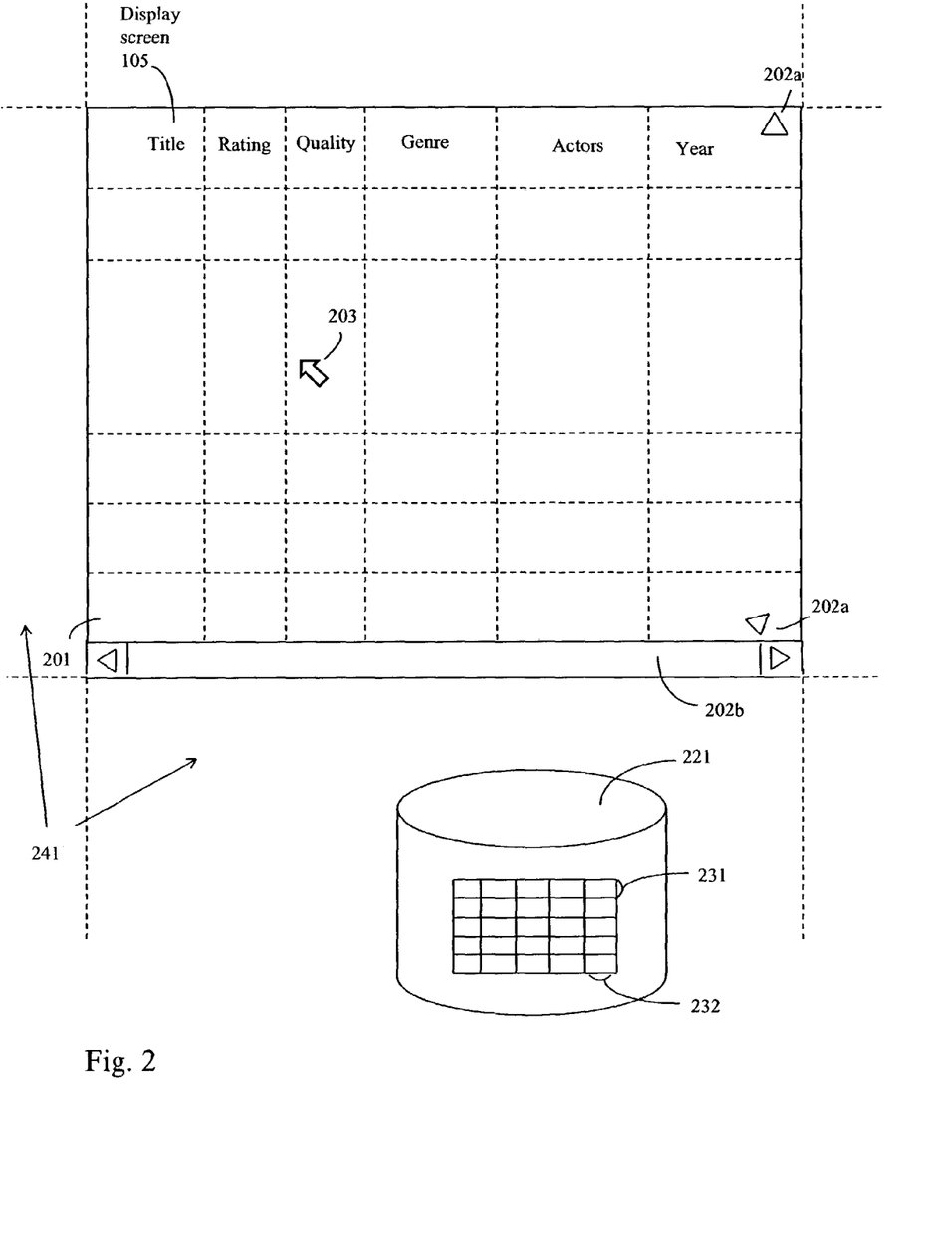
FIG. 2 shows a block diagram of an on-screen display including operation of a grid-like guided user interface for video selection and display.

FIG. 2 shows a block diagram of an on-screen display including operation of a grid-like guided user interface for video selection and display.

Screen Display

Those skilled in the art will recognize that the input element 103 (such as for example the remote control) and the display screen 105 operate in combination or conjunction, under control of the processor 101 and the program and data memory or mass storage 102, to present a UI (user interface) as described herein.

The UI includes at least some elements to be presented on the display screen 105, including possibly a set of screen regions 201 (possibly disjoint or possibly overlapping), a set of scroll affordances 202a or scroll bars 202b (possibly horizontal or possibly vertical), one or more highlighting features or pointing elements 203, one or more iconic or symbolic elements 204, one or more pictures (possibly still pictures, animation, or motion video), one or more units of text (possibly presented in one or more fonts), and the like.

The UI also includes at least some elements to be received from the user 112 (possibly presented on the display screen 105 or on the touch-panel control 103b), such as a set of buttons 211, possibly pre-selected and fixed in function, or possibly selected in response to user preferences or other input and alterable in function from time to time. For example, not intended to be limiting in any way, an arrangement of buttons 211 might be shown (a) directly on the remote control 103a, and selected by the user 112 by pressing one of the physical buttons 211; (b) directly on the touch-panel control 103b, and selected by the user 112 by pressing one of the areas designated on that touch-panel control 103b as one of the buttons 211; or (c) directly on the display screen 105 in a selected screen region 201, and selected by the user 112 by selecting the button 211 using the pointing device or keyboard.

As described herein, references to the UI "interpreting" input, "presenting" output, or "reacting to" input, describe operations by the processor 101 and the program and data memory or mass storage 102, as described above, to (a) receive commands or requests 113 from the user 112, (b) parse or recognize those commands or requests 113, (c) determine one or more responses 114 to make to those commands or requests 113, and (d) direct the at least one output element 104 to present those responses 114 to the user 112.

For example, in one embodiment, the processor 101 and the program and data memory or mass storage 102, might be responsive to (a) receive inputs from the user 112, and respond to those inputs by moving a position of the pointing element 203, (b) respond to a relative position of that pointing element 203 with regard to one of the screen regions 201, and respond by highlighting or de-highlighting selected screen regions 201, (c) respond to a relative position of that pointing element 203 with regard to one of the scroll affordances 202a or scroll bars 202b, and respond by scrolling or paging one or more of the screen regions 201, (d) respond to a relative position of that pointing element 203 with regard to one of the iconic or symbolic elements 204, and respond by invoking or de-invoking an selected function associated with that one iconic or symbolic element 204, (e) as well as reasonable generalizations thereof, and the like.

Database Presentation

The UI includes a "Guide" mode of operation, in which the display screen 105 is partitioned into a rectilinear tiled set of screen regions 201, such as for example disjoint regions as one might find in a chessboard, although in the context of the invention, there is no particular requirement that each such screen region 201 need be the same height or width. As described herein the rectilinear tiled set of screen regions 201 comprise a set of rows 211 and a set of columns 212, each such row 211 and column 212 intersecting in a single substantially disjoint such screen regions 201.

In one embodiment, the "Guide" mode of operation is performed in association with a database 221. In one embodiment, the database 221 is available to the processor 101 at the program and data memory 102, but in the context of the invention, there is no particular requirement where the database 221 is specifically located. For example, the database 221 might be located (a) at a remote device available processor 101 using the communication device 111, (b) at an auxiliary processor 101b coupled to the processor 101 or the program and data memory 102, or (c) on a computer-readable medium 222 coupled to a reader 223 thereof, to the processor 101 or the program and data memory 102, or to any other element of the system 100.

The database 221 preferably includes information involving a library or set of videos, such as for example movies that might be selected for presentation, and presented, to the user 112. However, in the context of the invention, there is no particular requirement that the database 221 is limited to videos, or even to information that might be presented to the user 112. For one example, not intended to be limiting in any way, the invention could be used to represent advertisements, animation, audio titles, books or other textual works, computer programs in source or object code form, encyclopedia entries, magazines or articles therefrom, microfiche images, people (real or fictional), still pictures, or more generally, database entries of any kind. Moreover, in the context of the invention, there is no particular requirement that the database 221 is the sole source of information to be presented to the user 112. For one example, not intended to be limiting in any way, the invention could be used in combination or conjunction with other techniques for presenting or representing information, such as in any of the following possibilities: a plurality of such databases 221, a hierarchical representation of data, a hyperlinked representation of data (such as for example a web page), a dynamically generated representation of data (such as for example by an applet), or some combination or mixture thereof.

In one embodiment, the database 221 includes one entry 231 for each such video, and a set of data fields 232, with the property that for each such entry 231, at least some of those data fields 232 have information relating to that entry 231, and with the property that the information in each data field 232 for a first entry 231 bears the same relation to that first entry 231 as the information in that data field 232 for a second entry 231. For one example, not intended to be limiting in any way, if a data field 232 is selected to represent the title of an entry 231, for each entry 231 for which that data field 232 has any information, that information represents the title of that entry 231.

In one embodiment, the database 221 includes a plurality of such entries 231, and a plurality of such data fields 232, with the effect that an individual entry 231 might (or might not) have the same information as another such entry for a related data field 232. For one example, not intended to be limiting in any way, more than one entry 231, each representing a distinct video, might each have a data field 232 representing the genre of that video (such as for example a "comedy" or a "western"), and more than one such entry 231 might have the same information for that data field 232, such as for example if both such videos were comedies.

The database 221 might include multiple data values 222 for one or more such data fields 232 for an entry 231, such as for example a single video might be associated with multiple actors or multiple genres.

In one embodiment, each such row 211 is used by the UI to represent an entry 231 in a database 221 of information about which the user 112 desires to request and display information, while each such column 212 is used by the UI to represent a data field 232 in that database 221. One such row 211 is used by the UI to represent a set of names of those data fields 232. However, in the context of the invention, there is no particular requirement that rows 211 are associated with entries 231 and that columns 212 are associated with data fields 232. For one example, not intended to be limiting in any way, in alternative embodiments rows 211 might be associated with data fields 232 and columns 212 might be associated with entries 231. Accordingly, as described herein, if entries 231 are sometimes referred to as rows 211 and data fields 232 are sometimes referred to as columns 212, such description is merely exemplary and is not intended to be limiting in any way.

Database Window

In a preferred embodiment, the number of columns 212 is relatively limited, with the effect that for a selected entry 231, all or most of those columns 212 will fit within the width of the display screen 105. In one embodiment, the number of columns 212 is limited to an exemplary six such fields, such as for example, (a) title, (b) maturity rating, (c) quality rating, (d) genre, (e) actors, and (f) year of publication. Additional such fields, such as for example (g) director, (h) language, (i) a summary description of the movie, (j) a more detailed description or set of reviews of the movie, and the like, might be presented in response to a user-selected option, or might be substituted for one or more of the exemplary six fields, such as for example substituting director for actors or substituting language for year of publication.

In contrast, in a preferred embodiment, the number of entries 231 is relatively large in comparison with a size of the display screen 105, with the effect that the user 112 is presented with a visual illusion of scrolling or paging through a virtual presentation 241 of a relatively long list of rows 211 for such entries 231. This is shown in the figure by a virtual presentation 241 including a set of virtual rows 211 for entries 231 not actually presented on the display screen 105, but having the effect of a visual illusion of being available for viewing when the user 112 scrolls or pages using the display screen 105 to the virtual presentation 241 including a set of virtual rows 211 for entries 231.

Similarly, in one embodiment, the user 112 is also presented with a visual illusion of scrolling or paging through a virtual presentation 241 of a relatively wide list of such columns 212 for data fields 232. That is, the virtual presentation 241 also includes a set of virtual columns 212 not actually presented on the display screen 105, but having the effect of a visual illusion of being available for viewing when the user 112 scrolls or pages using the display screen 105 to the virtual presentation 241 including a set of virtual columns 212 for data fields 232.

This has the effect of presenting to the user 112 a visual illusion that the display screen 105 is positioned with a selected entry 231 as one of the rows 211 presented within the display screen 105, and a selected data field 232 as one of the rows 212 presented within the display screen 105.

In one embodiment, a centralized row 211a is used for the selected entry 231. This has the effect of presenting to the user 112 a visual illusion that the display screen 105 is centered on the selected entry 231, even when the user 112 changes the focus of the UI to a new selected entry 231 (herein also called the "focused-upon" entry 231). Thus, when the user 112 scrolls, pages, or otherwise selects a new row 211 for the focused-upon entry 231, the UI centralizes that row and presents it as the new centralized row 211a. This has the effect that the focused-upon entry 231 is generally the easiest to read.

It has been found by the inventors that presenting the focused-upon entry 231 as the centralized row 211a presents a UI pleasing to most users, and that the degree to which the UI is pleasing to users is a surprising advantage, which would not have been obvious to those skilled in the art without perusal of this application.

Entry Squinting

When the number of entries 231 is in the hundreds or in the thousands, the relatively long list might seem, to the user 112, very long indeed. Accordingly, each such entry 231 is collapsed to a relatively minimal presentation when not focused-upon by the user 112, and is expanded to a substantially more detailed presentation when focused-upon, with the effect that many such entries 231 can be displayed concurrently on the display screen 105. This has the effect that the user 112 is presented with a visual illusion of squinting at an entry 231 by focusing upon that entry 231, with the effect that when squinted at, the entry 231 becomes more detailed and its data more informational. Accordingly, this effect is herein sometimes referred to as "squinting" at the focused-upon entry 231, or as later described herein, "entry squinting."

In one embodiment, the user 112 indicates that the focused-upon entry 231 should be expanded by an additional action, such as a button press, mouse click, or touch-pad tap. However, in the context of the invention, there is no particular requirement that one of these specific additional actions is required. Those skilled in the art would recognize, after perusal of this application, that one or more of the following alternatives might be used to signal that the focused-upon entry 231 should be expanded, either in combination or conjunction:

For example, not intended to be limited in any way, the Guide might trigger squinting at the focused-upon entry 231 in response to a timer. The timer might be triggered by one or more of the following: (a) the user 112 does not change the selection of the focused-upon entry 231, that is, the focused-upon entry 231 remains the same for a brief delay; (b) the user 112 does not move the pointer 203 away from the focused-upon entry 231, that is, the focused-upon entry 231 is selected and the selection is "held" on the focused-upon entry 231 for a brief delay.

For example, not intended to be limited in any way, the Guide might trigger squinting at the focused-upon entry 231 in response to challenge to the user 112 and a response therefrom. For example, not intended to be limiting in any way, the challenge might include one or more of the following: (a) a question asked by the UI of the user 112, determining a yes/no answer whether to trigger squinting at the focused-upon entry 231; (b) highlighting of the focused-upon entry 231 and waiting for a response (or a non-response, as with the timer possibility indicated above).

Those skilled in the art would recognize, after perusal of this application, that in the former case, the Guide provides a more automated-like response to user action, while in the latter case, the Guide provides a more command-like response to user action.

It has been found by the inventors that the following parameters present a UI pleasing to most users, and that the degree to which the UI is pleasing to users is a surprising advantage, which would not have been obvious to those skilled in the art without perusal of this application. Minimal-sized rows 211 for entries 231 should have columns 212 for data fields 232 displaying about one data element, while expanded rows 211 for entries 231 should have columns 212 for data fields 232 showing about zero to four data elements, such as for example no more than about four actors or four genres named for each movie. The UI also provides for the user 112 to make a request 113 for the UI to present more details about an entry 231, such as substantially all of its data elements, such as for example all of the actors and all of the genres named for the focused-upon movie.

When the UI does not display all columns 212 for data fields 232 for a particular entry 231, the choice of which data elements in that data field 232 is responsive to sorting the data field 232 relative to a measure of importance for each such data element. For example, not intended to be limiting in any way, when only one data element is shown, it is the most important actor or genre for that movie (according to information about that movie in the database 221), while when up to four data elements are shown, they would be up to the four important actors or genres for that movie (again, according to information about that movie in the database 221).

In a preferred embodiment, when a selected entry 231 is focused-upon, that entry 231 is highlighted and centered in the display screen 105, while other entries 231 have lesser highlighting and are less centered. The degree of highlighting follows an emphasis curve 251 shown in the figure, where elements of the curve further to the right indicate relatively greater emphasis (those entries 231 central to the display screen 105 and closer to the focused-upon entry 231), while elements of the curve further to the left indicate relatively lesser emphasis (those entries 231 not central to the display screen 105 and not closer to the focused-upon entry 231). This has the effect that the focused-upon entry 231 is easier for the user 112 to review and inspect, while those entries 231 that are not focused-upon present substantially less distraction to the user 112.

It has been found by the inventors that the following parameters present a UI pleasing to most users, and that the degree to which the UI is pleasing to users is a surprising advantage, which would not have been obvious to those skilled in the art without perusal of this application. The focused-upon entry 231 should have a degree of highlighting similar to the weight associated with the central elements of a Gaussian curve, while those entries 231 that are not focused-upon should have a degree of highlighting similar to the weight associated with the tail elements of a Gaussian curve. For one example, without intending any limitation in any way, the focused-upon entry 231 and its neighbor entries 231 are about twice as bright as all other entries 231, while the focused-upon entry 231 is about as bright as its neighbor entries 231, but is also presented with a distinct background color.

In alternative embodiments, a similar procedure for squinting at a focused-upon entry 231 may be applied to a focused-upon data field 232. That is, when the user 112 selects an individual column 212 for a data field 232 to be focused-upon, the UI may expand all the rows 211 for entries 231 on the display screen 105, for that specific data field 232. This has the effect that the user 112 might, in the process of examining a sequence of rows 211 for entries 231, determine that it is advantageous to review the genre column 212 in more detail. In such cases, the genre column 212 would be expanded in a similar procedure to squinting at a focused-upon entry 231.

In alternative embodiments, a similar procedure for highlighting a focused-upon entry 231 may be applied to a focused-upon data field 232. That is, when the user 112 selects an individual column 212 for a data field 232 to be focused-upon, the UI may highlight data fields 232 in response to their distance from that column 212.

Data Field Squinting

As noted above, in a preferred embodiment, the number of columns 212 is relatively limited, with the effect that for selected entry 231, almost those columns 212 will fit within the width of the display screen 105. In one embodiment, one such column, such as for example the title of the movie, is placed in a preferred location, such as for example at the left of the display screen 105. This has the effect that the user 112 can readily locate the title of the movie, which is often the most important information about that particular movie.

However, in the context of the invention, there is no particular preference or requirement for a pre-selected ordering to be assigned to other columns 212 or to other data fields 232. Accordingly, in those cases when the user 112 focuses on a single such column 212 or data field 232 (herein referred to as the "focused-upon" column 212 or data field 232), the UI provides for possible rearrangement of rows 211 and columns 212 on the display screen 105, in response to the user 112 focusing upon the selected column 212 or data field 232.

Those skilled in the art will recognize, after perusal of this application, that such possible rearrangement of rows 211 and columns 212 on the display screen 105, in response to the user 112 focusing upon the selected data field 232, might include one or more of a number of actions. These possible actions are herein sometimes referred to as "data field squinting" for focused-upon data fields 232, in contrast to "entry squinting" as described above for focused-upon entries 231.

For example, not intended to be limited in any way, data field squinting might include highlighting the focused-upon data field 232. In a preferred embodiment, such highlighting is similar to highlighting of the focused-upon entry 231. This has the effect of imposing a degree of highlighting for the focused-upon data field 232 and relatively nearby data fields 232 an amount of highlighting similar to the weight associated with the central elements of a Gaussian curve, while imposing a degree of highlighting for data fields 232 relatively distant from the focused-upon data field 232 a degree of highlighting similar to the weight associated with the tail elements of a Gaussian curve. For one example, without intending any limitation in any way, the focused-upon data field 232 and its neighbor data fields 232 are about twice as bright as all other data fields 232, while the focused-upon data field 232 is about as bright as its neighbor data fields 232, but is also presented with a distinct background color. However, as described below, not necessarily all of the data in the data field 232 is actually highlighted.

For example, not intended to be limited in any way, data field squinting might include moving the focused-upon data field 232, such as for example to a centralized location in the display screen 105, or such as for example to a location in the display screen 105 near to the title column 212. This has the effect of locating the focused-upon data field 232 in a place on the display screen 105 where the user might relatively easily find it or notice it. Those skilled in the art will recognize, after perusal of this application that, in addition to moving the focused-upon data field 232, other data fields 232 (such as for example data fields 232 found to be often used in conjunction are combination with the focused-upon data field 232) might also be moved in a similar manner, in response to moving the focused-upon data field 232.

For example, not intended to be limited in any way, data field squinting might include resizing the focused-upon data field 232 (that is, altering the width of, such as for example to be wider and thus more prominent). This has the effect of making the focused-upon data field 232 take-up space on the display screen 105 where the user might relatively easily find it or notice it. Those skilled in the art will recognize, after perusal of this application that, in addition to resizing the focused-upon data field 232, other data fields 232 (such as for example data fields 232 found to be often used in conjunction are combination with the focused-upon data field 232) might also be resized in a similar manner, in response to resizing the focused-upon data field 232.

Similar to "entry squinting," as described above with regard to focused-upon entries 231, in one embodiment, the user 112 indicates that the focused-upon data field 232 should be focused-upon (with the effect of highlighting, moving, or resizing the column 212 associated with that data field 232) by an additional action, such as a button press, mouse click, or touch-pad tap. However, in the context of the invention, there is no particular requirement that one of these specific additional actions is required. Those skilled in the art would recognize, after perusal of this application, that one or more of the following alternatives might be used to signal that the focused-upon data field 232 should be expanded, either in combination or conjunction:

For example, not intended to be limiting in any way, the Guide might trigger data field squinting for the focused-upon data field 232 in response to a timer. The timer might be triggered by one or more of the following: (a) the user 112 does not change the selection of the focused-upon data field 232, that is, the focused-upon data field 232 remains the same for a brief delay; (b) the user 112 does not move the pointer 203 away from the focused-upon data field 232, that is, the focused-upon data field 232 is selected and the selection is "held" on the focused-upon data field 232 for a brief delay.

For example, not intended to be limited in any way, the Guide might trigger data field squinting for the focused-upon data field 232 in response to challenge to the user 112 and a response therefrom. For example, not intended to be limiting in any way, the challenge might include one or more of the following: (a) a question asked by the UI of the user 112, determining a yes/no answer whether to trigger squinting at the focused-upon data field 232; (b) highlighting of the focused-upon data field 232 and waiting for a response (or a non-response, as with the timer possibility indicated above).

Data Field Reordering

As noted above, in a preferred embodiment, most of the entries 231 presented within the display screen 105 are collapsed to a relatively minimal presentation when not focused-upon by the user 112. In one embodiment, when the user 112 selects an entry 231 to be focused-upon, that entry 231 is expanded, with the effect that multiple data elements for each of its data fields 232 might be presented.

In one embodiment, when the user 112 selects one of these data fields 232 as the focused-upon data field 232, the UI sorts the entire collection of entries 231 with regard to the data in the focused-upon data field 232. Since there might be multiple data elements for the focused-upon data field 232, the UI replicates the focused-upon entry 231 for each different data element in the focused-upon data field 232. For example, not intended to be limiting in any way, if the focused-upon entry 231 has four actors in the "actor" data field 232, and the user 112 selects the "actor" data field 232 as the focused-upon data field 232, the UI will present that entry 231 four times, once for each such actor in the "actor" data field 232 for that entry 231. This has the effect that, if the user 112 scrolls or pages through the (possibly very long) list of entries 231, the user 112 will see that entry 231 presented once for each such actor.

This has the effect that replication of only the focused-upon entry 231, and not other entries 231, avoids the combinatoric explosion of expanding all such entries 231, while still allowing the UI to present the focused-upon entry 231 in all locations where the user 112 might expect to see that entry 231 (that is, in every section of the list of entries 231 in which one of the data elements in the focused-upon data field 232 would be found). For example, not intended to be limiting in any way, this has the effect that when a movie is assigned to more than one genre, such as for example both a comedy and a western, it can be found by the user 112 when scanning the sorted list of entries 231, in either the comedy genre section or the western genre section. This has the effect that when a movie is assigned to multiple genres, the user 112 will readily find that movie even if that user 112 restricts attention to only one of the multiple genres for that movie.

Moreover, when the list of entries 231 is sorted, the focused-upon data field 232 is emphasized, preferably by highlighting a portion of that data field 232 with regard to one of its data elements. As described herein, the UI highlights only the sorting letter (that is, the letter by which the data element was sorted), and moreover, that sorting letter is the only the first letter of that data element when articles (such as "A", "An", "The", and the like), and other known stop-words are not considered for sorting. For example, not intended to be limiting in any way, a movie with the title "The Bourne Identity" would be sorted under B (for "Bourne"), and the B would be highlighted rather than any other letter in the title.

Similarly, when the name of an actor, director, or other individual is presented, the sorting letter is preferably responsive to the last name of the person, and moreover, that sorting letter is the first letter of the last name when honorifics and other name peculiarities are not considered for sorting. For example, not intended to be limiting in any way, a person with the name "Sir Winston Churchill" would be sorted under C (for "Churchill"), and a person with the name "Erich von Stroheim" would be sorted under S (for "Stroheim"), and the sorting letter (C or S in these cases) would be highlighted rather than any other letter in the person's name. In the latter case, it may be that the person would be sorted under both V (for "von") and S (for "Stroheim"), with the effect that more than one entry 231 would be presented for that person.

In alternative embodiments, the user 112 may be allowed to select those words considered to be stop-words, or other manipulations of the data elements in the focused-upon data field 232 for sorting purposes, so that for example, the title "The Wind Done Gone" might be sorted into the same portion of the list of entries 231 as the title "Gone With the Wind" when the data field 232 for title is selected by the user 112 as the focused-upon data field 232.

It has been found by the inventors that these effects, both individually and in combination, present a UI pleasing to most users, and that the degree to which the UI is pleasing to users is a surprising advantage, which would not have been obvious to those skilled in the art without perusal of this application.

Similar to both "entry squinting" and "data field squinting," as described above, in one embodiment, the user 112 indicates that the focused-upon data field 232 should be reordered after being focused-upon by an additional action, such as a button press, mouse click, or touch-pad tap. However, in the context of the invention, there is no particular requirement that one of these specific additional actions is required. Those skilled in the art would recognize, after perusal of this application, that one or more of the following alternatives might be used to signal that the focused-upon data field 232 should be reordered, either in combination or conjunction:

For example, not intended to be limited in any way, the Guide might trigger data field reordering for the focused-upon data field 232 in response to a timer. The timer might be triggered by one or more of the following: (a) the user 112 does not change the selection of the focused-upon data field 232, that is, the focused-upon data field 232 remains the same for a brief delay; (b) the user 112 does not move the pointer 203 away from the focused-upon data field 232, that is, the focused-upon data field 232 is selected and the selection is "held" on the focused-upon data field 232 for a brief delay.

For example, not intended to be limited in any way, the Guide might trigger data field reordering for the focused-upon data field 232 in response to challenge to the user 112 and a response therefrom. For example, not intended to be limiting in any way, the challenge might include one or more of the following: (a) a question asked by the UI of the user 112, determining a yes/no answer whether to trigger squinting at the focused-upon data field 232; (b) highlighting of the focused-upon data field 232 and waiting for a response (or a non-response, as with the timer possibility indicated above).

Scrolling and Paging

In one embodiment, when the list of entries 231 is in a sorted state (that is, it has been presented in an initial sort order, or has been reordered by the user 112), the user 112 is presented with the both the options of (a) moving individually down the list of entries, with the effect that the entries 231 presented within the display screen 105 are scrolled or paged, and (b) skipping to the next section with a different data value for a selected field, with the effect that the entries 231 presented within the display screen 105 are completely changed to the new entries 231 associated with that portion of the list of entries 231. For example, not intended to be limiting in any way, a user can skip to the comedy section without having to scroll through multiple entries that might precede that section.

Method of Operation

Figure 3:
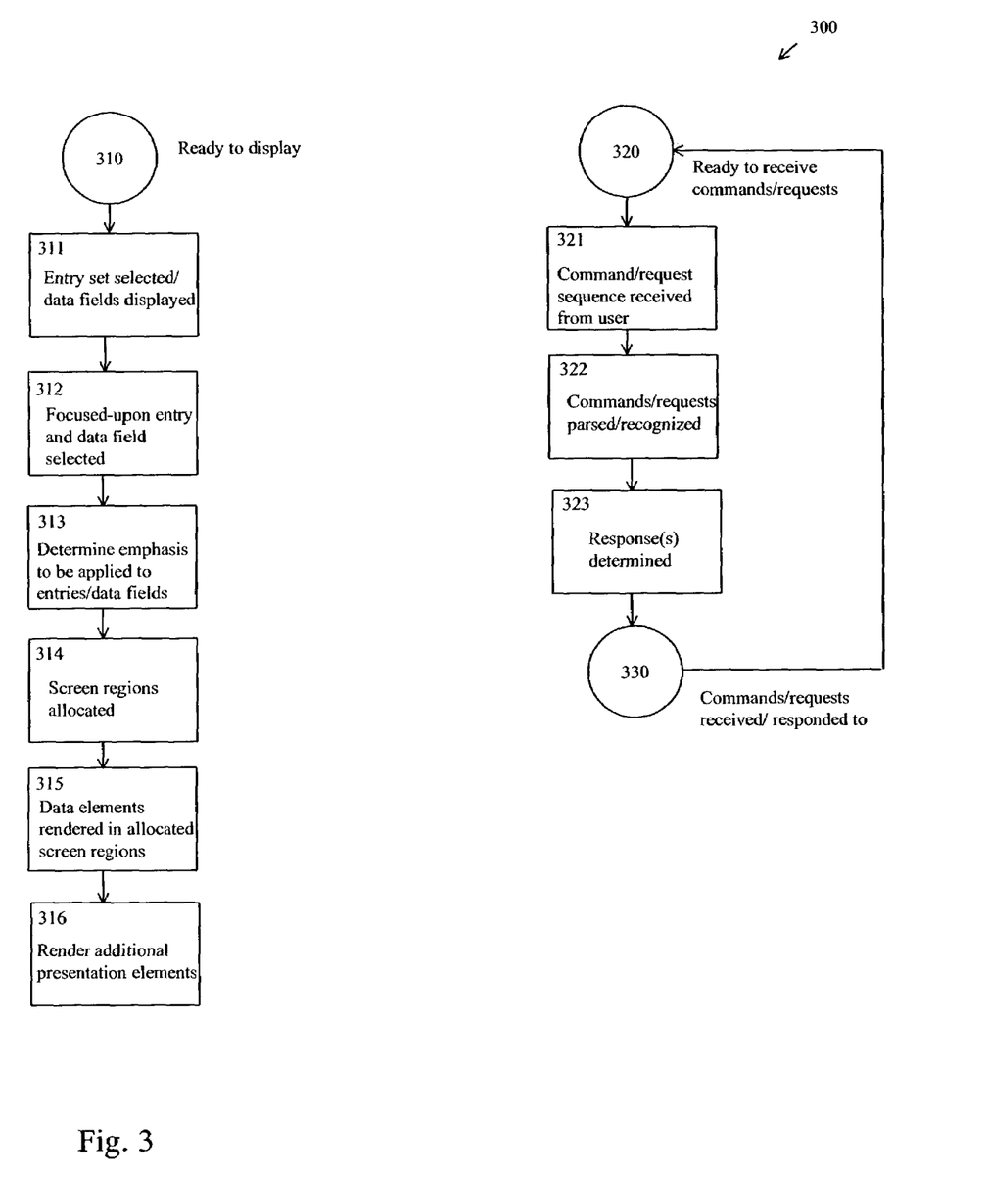
FIG. 3 shows a process flow diagram of a method including operation of a grid-like guided user interface for video selection and display.

FIG. 3 shows a process flow diagram of a method including operation of a grid-like guided user interface for video selection and display.

A method 300 is performed by the system 100. Although the method 300 is described serially, the flow points and steps of the method 300 can be performed by separate elements in conjunction or in parallel, whether asynchronously or synchronously, in a pipelined manner, or otherwise. There is no particular requirement that the method 300 must be performed in the same order in which this description lists flow points or steps, except where explicitly so indicated.

Screen Display

At a flow point 310, the system 100 is ready to display a portion of the database 221 on the display screen 105.

At a step 311, the system 100 selects a set of entries 231, and for those entries 231, a set of data fields 232 to be displayed. In one embodiment, as described herein, the selected set of entries 231 and the selected set of data fields 232 are responsive to one or more inputs from the user 112. In alternative embodiments, the selected set of entries 231 and the selected set of data fields 232 may be responsive to metadata associated with a focused-upon entry 231, a focused-upon data field 232, or both. For example, not intended to be limiting in any way, the system 100 might select a first set of data fields 232 for presentation when the focused-upon entry 231 and the focused-upon data field 232 indicate that the movie is a cartoon (that is, an animated short movie), while the system 100 might select a second set of data fields 232 for presentation when the focused-upon entry 231 and the focused-upon data field 232 indicate that the movie is a documentary or a drama.

At a step 312, the system 100 selects a focused-upon entry 231 and a focused-upon data field 232. In one embodiment, as described herein, the selected focused-upon entry 231 and the selected focused-upon data field 232 are responsive to one or more inputs from the user 112. In alternative embodiments, the selected set of entries 231 and the selected set of data fields 232 may be responsive to other information, such as for example (a) collaborative filtering associated with a recent set of focused-upon entries 231 and focused-upon data fields 232, (b) demographic information associated with the user 112, (c) pseudo-random or random values. This other information may be used in combination or conjunction, and may be used in combination or conjunction with one or more inputs from the user 112. For example, not intended to be limiting in any way, the system 100 may select a focused-upon entry 231 or a focused-upon data field 232 in response to feedback from the user 112 regarding a recent set of such focused-upon entries 231 or focused-upon data fields 232.

At a step 313, the system 100 determines what emphasis (such as for example highlighting) to be applied to those entries 231 and data fields 232, in response to the selected set of entries 231, the selected set of data fields 232, the selected focused-upon entry 231, the selected focused-upon data field 232, the data elements found from the database 221 with regard to those entries 231 and data fields 232, and the set of articles and other stop-words determined by the system 100 to not be highlighted. In alternative embodiments, as part of this step, the system 100 might conduct any transformations of the data elements found from the database 221 with regard to those entries 231 and data fields 232, as requested by the user 112. For example, not intended to be limiting in any way, the system 100 might perform automatic language translation among natural languages, or automatic substitution of languages in response to demographic information about the user 112.

At a step 314, the system 100 allocates screen regions 201 within the area of the display screen 105, in response to the selected set of entries 231, the selected set of data fields 232, the selected focused-upon entry 231, the selected focused-upon data field 232, and the data elements found from the database 221 with regard to those entries 231 and data fields 232. As described herein, these screen regions 201 might vary in size, in response to (a) which entries 231 are relatively centralized, (b) which are the selected set of data fields 232, (c) which is the selected focused-upon entry 231, (d) which is the selected focused-upon data field 232, (e) the data elements found from the database 221 with regard to those entries 231 and data fields 232, and (f) emphasis such as highlighting to be applied to those entries 231 and data fields 232.

At a step 315, the system 100 renders the data elements found from the database 221 in the allocated screen regions 201.

At a step 316, the system 100 renders any other presentation elements to be shown on the display screen 105, such as for example (a) scroll affordances 202a or scroll bars 202b, (b) pointing elements 203, (c) iconic or symbolic elements 204, (d) pictures, (e) text, (f) dividing lines between the screen regions 201, (g) touch-panel buttons 211 or other heads-up display elements, (h) status indicators about the system 100 drawn from outside the database 221, and the like. As part of this step, the system 100 renders any transitions from earlier presentation states, such as fade-in/fade-out, and the like.

At a flow point 320, the system 100 has displayed a portion of the database 221 on the display screen 105, and is ready to receive commands or requests 113 from the user 112.

User Requests and Responses

As described above, at the flow point 320, the system 100 has displayed a portion of the database 221 on the display screen 105, and is ready to receive commands or requests 113 from the user 112.

At a step 321, the system 100 receives a sequence of commands or requests 113 from the user 112. In one embodiment, the user 112 enters these commands or requests 113 from the at least one input element 103 in the form of button presses, such as for example from the television infrared remote control 103a or touch-panel control 103b, where the button presses might indicate (a) directions such as right, left, up, down, (b) selection or de-selection, or (c) alphanumeric entry of letters or numbers. In alternative embodiments, the user 112 may enter these commands or requests 113 from the at least one input element 103 in the form of keyboarding, mouse clicks and double-clicks, possibly in combination or conjunction with mouse movement, such as for example as might be used in entering commands or requests 113 for an ordinary PC programming environment. In further alternative embodiments, the user 112 may enter these commands or requests 113 from the at least one input element 103 in the form of voice commands or other biometric input techniques.

At a step 322, the system 100 parses or recognizes those commands or requests 113 received from the user 112. Those commands or requests 113 might direct assistant to perform actions such as described above with regard to FIG. 1 and FIG. 2.

At a step 323, the system 100 determines one or more responses 114 to make to those commands or requests 113 received from the user 112. As part of this step, the system 100 directs the at least one output element 104 (including the display screen 105) to make those responses 114, in such manner that the user 112 might readily understand those responses 114.

As part of this step, it might occur as described above that the system 100 performs one or more of the following actions, possibly in combination or conjunction:

The system 100 (a) moves the position of the pointing element 103, (b) highlights or de-highlights selected screen regions 201, (c) scrolls or pages one or more of the screen regions 201, or (d) invokes or de-invokes a selected function associated with one or more iconic or symbolic elements 204.

The system 100 (a) presents one or more selected entries 231, along with one or more selected data fields 232 associated with those entries 231, on the display screen 105, with the effect that the user may review those selected entries 231 and those selected data fields 232; or (b) changes the focused-upon entry 231 or the focused-upon data field 232, along with according changes to representation of the focused-upon entry 231 or the focused-upon data field 232.

The system 100 (a) presents "entry squinting" for one or more focused-upon entries 231, (b) presents "data field squinting" for one or more focused-upon data fields 232. As part of this step, it might occur as described above that the system 100 presents a question, such as in the form of a dialog box or confirmation requests, to the user 112 in response to those commands or requests 113.

The system 100 (a) reorders the list of entries 231 in response to a change in the focused-upon data field 232, and (b) provides multiple copies of each entry 231 having multiple data elements in that focused-upon data field 232. As part of this step, it might occur as described above that the system 100 presents a question, such as in the form of a dialog box or confirmation requests, to the user 112 in response to those commands or requests 113.

At a flow point 330, the system 100 has received and responded to a commands or requests 113 from the user 112, and is ready to continue with the flow point 320 to do so again. As part of the method 300 proceeding from the flow point 320 to the flow point 330, the system 100 performs the steps described in association with the flow point 310.

ALTERNATIVE EMBODIMENTS

Although preferred embodiments are disclosed herein, many variations are possible which remain within the concept, scope, and spirit of the invention. These variations would become clear to those skilled in the art after perusal of this application.

The invention applies to any information to be presented or represented, not necessarily just to video titles. For example, not intended to be limiting in any way, the invention could be used to represent advertisements, animation, audio titles, books or other textual works, encyclopedia entries, magazines and articles therefrom, people (real or fictional), still pictures, or more generally, database entries of any kind.

The invention might be combined with other techniques for presenting or representing information. For example, not intended to be limiting in any way, the invention could be combined with a hierarchical representation of data, a hyperlinked representation of data, a dynamically generated representation of data (such as for example by an applet), or some combination or mixture thereof.

The invention might be combined with techniques described in the incorporated disclosure. For a first example, not intended to be limiting in any way, the UI might present a linear ordering of each entry, with one data field in a selected row (or column), and cause that linear arrangement to be dynamically rearranged in response to the user focusing on a selected data field. This would have the effect that if the user selected a picture data field, the linear arrangement would be responsive to similarity of pictures, if the user selected a text data field, the linear arrangement would be responsive to similarity of text, and if the user selected a numeric value data field, the linear arrangement would be responsive to similarity of numeric value. The use of a similarity measure would be in contrast to the alphanumeric ordering used by the "Guide" shown in the incorporated disclosure. Alternatively, the selected data field may be more heavily weighted rather than being the only data field responded to.

The invention might be combined with techniques described in the incorporated disclosure. For a second example, not intended to be limiting in any way, the UI might present an arrangement on the display screen, with the user being given the opportunity to select weights to assign to each data field when determining the measure of content distance. In one embodiment, the user might mark selected data fields, and obtain a pseudorandom two-dimensional display responsive to those data fields. Alternatively, the user might select a relative weight to assign to each data field, with that relative weight either being variable from 0% to 100% relative weight, or being restricted to being variable to a less inclusive range, such as for example 20% to 80% relative weight. In the first alternative, this would have the effect that if the user marked a picture data field and a numeric value data field, the two-dimensional arrangement would be responsive to similarity of both the pictures and the numeric values, but not other data fields. In the second alternative, this would have the effect that if the user marked a picture data field and a numeric value data field with high relative weights, the two-dimensional arrangement would be responsive to similarity of both the pictures and the numeric values, but also to other data fields.

Those skilled in the art will recognize, after perusal of this application, that these alternative embodiments are illustrative and in no way limiting.

The invention claimed is:

1. A method for an entertainment selection system, comprising the steps of
    representing on a display at least some of a set of media selection entries each having a set of media attribute data fields associated therewith, wherein a result of said steps of representing includes (a) a relative ordering of said some media selection entries, and (b) a selection of values associated with at least some of said media attribute data fields; and
    dynamically altering said representation in response to a selection of at least one focused-upon media attribute data field, wherein a result of said steps of altering includes a new said relative ordering in response to at least one of (a) a measure of similarity to said focused-upon media attribute data field for at least one specified media entry, and (b) a measure of similarity to said focused-upon media attribute data field for at least one specified media entry and a random effect;
    wherein the specified media selection entry is maintained in substantially the same location while reordering substantially all other media selection entries responsive to values of the media attribute data fields corresponding respectively to each of said substantially all other media selection entries, such that the reordering of the substantially all other media selection entries positions the specified media selection entry closer to the media selection entries containing the same media attribute data field value as the focused upon media attribute data field, than to those media selection entries that do not;
    further wherein a media selection entry is replicated on the display for each value of the media attribute data field of that media selection entry;
    further wherein the measure of similarity is also responsive to at least some metadata descriptive of the user.

2. A method as in claim 1, wherein said measure of similarity is responsive to a set of weights assigned to each said data field.

3. A method as in claim 2, wherein said set of weights is responsive to at least one of (a) a set of weights explicitly assigned by a user, (b) a set of weights responsive to a set of past user actions, (c) a set of weights responsive to demographic information about a user, or (d) a set of weights responsive to collaborative filtering information responsive to at least one user.

* * * * *